US008528591B2

(12) United States Patent
Pirk et al.

(10) Patent No.: US 8,528,591 B2
(45) Date of Patent: Sep. 10, 2013

(54) MICRO VALVE, METHOD FOR PRODUCING A MICRO VALVE, AS WELL AS MICRO PUMP

(75) Inventors: Tjalf Pirk, Stuttgart (DE); Michael Stumber, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 354 days.

(21) Appl. No.: 12/671,138

(22) PCT Filed: Jul. 4, 2008

(86) PCT No.: PCT/EP2008/058649
§ 371 (c)(1),
(2), (4) Date: Jun. 22, 2010

(87) PCT Pub. No.: WO2009/015983
PCT Pub. Date: Feb. 5, 2009

(65) Prior Publication Data
US 2010/0266432 A1    Oct. 21, 2010

(30) Foreign Application Priority Data
Jul. 30, 2007    (DE) .......................... 10 2007 035 721

(51) Int. Cl.
*F16K 17/26*    (2006.01)
(52) U.S. Cl.
USPC .................... 137/493.8; 137/493.9; 137/511; 137/843; 137/859; 251/331; 417/413.3
(58) Field of Classification Search
USPC ............... 137/493, 493.8, 493.9, 494, 495, 137/505.13, 505.26, 505.36, 505.38, 510, 137/511, 516.11, 516.13, 843, 859, 907; 251/331; 417/413.1, 413.3, 479
See application file for complete search history.

(56) References Cited

U.S. PATENT DOCUMENTS

| | | | | |
|---|---|---|---|---|
| 3,628,770 A | * | 12/1971 | Rost .............................. | 251/331 |
| 4,241,756 A | * | 12/1980 | Bennett et al. ................ | 137/496 |
| 4,470,760 A | * | 9/1984 | Jarrett et al. .................. | 417/221 |
| 4,865,584 A | * | 9/1989 | Epstein et al. ................. | 604/67 |
| 5,096,388 A | * | 3/1992 | Weinberg .................. | 417/413.3 |
| 5,178,182 A | * | 1/1993 | Kamen ...................... | 137/454.2 |
| 5,224,843 A | * | 7/1993 | van Lintel ................. | 417/413.2 |
| 5,725,363 A | * | 3/1998 | Bustgens et al. ........... | 417/413.1 |

(Continued)

FOREIGN PATENT DOCUMENTS

| | | |
|---|---|---|
| DE | 44 22 944 | 1/1996 |
| DE | 103 34 240 | 2/2005 |

(Continued)

OTHER PUBLICATIONS

International Search Report, PCT/EP2008/058649, dated Sep. 23, 2008.

(Continued)

*Primary Examiner* — John K Fristoe, Jr.
*Assistant Examiner* — Jessica Cahill
(74) *Attorney, Agent, or Firm* — Kenyon & Kenyon LLP

(57) ABSTRACT

A micro valve includes a first valve chamber and a second valve chamber as well as a closing element, which is adjustable between an opening position, in which the valve chambers are connected to each other, and a closing position in which the valve chambers are separated from each other. A reference chamber is provided, which is delimited by the closing element.

20 Claims, 7 Drawing Sheets

(56) References Cited

U.S. PATENT DOCUMENTS

| | | | |
|---|---|---|---|
| 5,944,050 A * | 8/1999 | Walker | 137/510 |
| 6,382,923 B1 * | 5/2002 | Gray | 417/53 |
| 6,390,791 B1 * | 5/2002 | Maillefer et al. | 417/413.3 |
| 6,416,293 B1 * | 7/2002 | Bouchard et al. | 417/53 |
| 6,663,359 B2 * | 12/2003 | Gray | 417/383 |
| 6,749,407 B2 * | 6/2004 | Xie et al. | 417/413.2 |
| 7,445,926 B2 * | 11/2008 | Mathies et al. | 435/288.5 |
| 7,631,852 B2 * | 12/2009 | Richter et al. | 251/61.1 |
| 7,740,459 B2 * | 6/2010 | Fuertsch et al. | 417/413.3 |
| 7,950,621 B2 * | 5/2011 | Meinig et al. | 251/61.4 |
| 8,104,497 B2 * | 1/2012 | Unger et al. | 137/15.05 |
| 2002/0155010 A1 * | 10/2002 | Karp et al. | 417/413.2 |
| 2004/0036047 A1 * | 2/2004 | Richter | 251/129.06 |
| 2004/0148777 A1 * | 8/2004 | Sjolander et al. | 29/890.127 |
| 2004/0155213 A1 * | 8/2004 | Yoo | 251/65 |
| 2004/0209354 A1 * | 10/2004 | Mathies et al. | 435/287.2 |
| 2006/0186085 A1 | 8/2006 | Fuertsch et al. | |
| 2009/0188576 A1 * | 7/2009 | Kang et al. | 137/831 |
| 2010/0078584 A1 * | 4/2010 | Van Den Bijgaart et al. | 251/331 |
| 2010/0266432 A1 * | 10/2010 | Pirk et al. | 417/472 |

FOREIGN PATENT DOCUMENTS

| | | |
|---|---|---|
| WO | WO 2005015021 A1 * | 2/2005 |
| WO | WO 2005088417 A1 * | 9/2005 |
| WO | WO 2007/004105 | 1/2007 |

OTHER PUBLICATIONS

Van Der Wijngaart W. et al., "A High-Stroke, High-Pressure Electrostatic Actuator for Valve Applications", Sensors and Actuators A, Elsevier Sequoia S.A., Lausanne, CH, vol. 100, No. 2-3, 2002, pp. 264-271.

Zengerle, R., "Stand Der Technik Bei Mikrofluidischen Aktoren", F & M Feinwerktechnik Mikrotechnik Mikroelektronik, Hanser, vol. 104, No. 4, 1996, pp. 241-244, 246.

* cited by examiner

MICRO VALVE, METHOD FOR PRODUCING A MICRO VALVE, AS WELL AS MICRO PUMP

FIELD OF THE INVENTION

The present invention relates to a micro valve, a method for producing a micro valve, and to a micro pump.

BACKGROUND INFORMATION

In micro-fluid technology, which provides new applications, e.g., in the pharmaceutical and medical field or in industrial processing engineering, elements for transporting and controlling the fluids are of particular importance. At present, the micro-valves used in micro pumps, in particular, are usually designed according to the dual-chamber principle, in which a closing element, which opens only at a particular pressure configuration as a function of the pressure differential between the two valve chambers, is situated between two valve chambers. Such a dual-chamber micro valve is described in DE 103 34 240. A disadvantage of a conventional micro valve is that it switches solely as a function of the pressure differential between the two valve chambers. Although a conventional micro valve is relatively easy to produce, there are endeavors nevertheless to develop micro valves that are even easier to produce, in particular micro valves having an expanded functionality.

SUMMARY

Example embodiments of the present invention provide a micro valve that has an expanded functionality and is easy to produce. Furthermore, example embodiments provide a suitable production method and also a micro pump having such a micro valve.

Example embodiments of the present invention are based on providing the design of the micro valve not on a dual-chamber principle but on at least a triple-chamber principle; in addition to the two valve chambers, between which a fluid exchange may take place, a reference chamber is provided, which is at least sectionally delimited by the closing element or a structure section connected to the closing element. The switching behavior of the micro valve is able to be influenced by the selection of the fluid pressure (gas or fluid) in the reference chamber, i.e., the reference pressure. In particular, the trigger pressure (working point), whose exceedance causes the micro valve to open, is selectable by the choice of the reference pressure. Of decisive advantage is that the micro valve basically does not operate as a function of the pressure differential between the two valve chambers, but as a function of the pressure differential between at least one of the valve chambers and the reference chamber. In a most basic arrangement, a micro valve is able to be provided such that it opens regardless of in which one of the two valve chambers the reference pressure in the reference chamber is exceeded. In other words, in a most basic development the micro valve switches or operates in both directions. On the other hand, in the case of a vacuum pressure, the valve preferably remains closed, thereby achieving the rectifier effect.

The micro valve is able to be produced in an uncomplicated manner in that substantially only two plates are used; the two plates, at least one of which has previously been structured, are joined. For example, it is possible to produce a base plate having the two valve chambers by hot stamping or injection molding, whereupon, for instance, a likewise hot-stamped or injection-molded functional layer having the closing element is joined with the base plate. Preferably, polymers are used as material for the base plate and/or the functional layer for this type of production.

For application fields that require greater precision and higher reproducibility, at least one of the plates, i.e., the base plate or the functional layer, may be produced by more precise micromechanical methods in semiconductor material, e.g., silicon or silicon oxide. At least one of the plates is then able to be produced using the trench-etching method, in particular. It is possible to produce the base plate from silicon or silicon oxide, for instance, and the functional layer from quartz glass, in particular doped quartz glass, such as boron silicate glass, and to affix the two plates to each other by anodic bonding, for example; when using such a jointing method it must be ensured that an anti-bonding layer is provided in the sealing region of the micro valve, i.e., in the region in which the closing element, implemented as diaphragm, in particular, cooperates with the base plate, especially with the end face of a separation wall of the base plate.

It is possible to first structure the base plate and the functional layer independently of each other and then to join them, or else to first structure the base plate, then join the functional layer with the base plate, and subsequently structure the functional layer fixed in place at the base plate, for instance by trench etching.

The micro valve not only has increased functionality because of the provision of the additional reference chamber, but it is also able to be produced in a particularly simple and therefore cost-effective manner, especially if at least one of the plates of the micro valve is made from silicon or silicon oxide.

It may be provided that the reference chamber is a chamber filled with a fluid and sealed on all sides, so that the fluid pressure inside the reference chamber is not able to be influenced actively. It is also possible to connect the reference chamber with the environment, in particular the atmosphere, so that the reference pressure corresponds to the ambient pressure, especially the atmospheric pressure. For example, the fluid pressure in the reference chamber is able to be influenced actively, that is to say, in which the trigger pressure of the micro valve is variable especially as a function of the switching tasks or the operating situation, preferably while the micro valve is in operation. For example, this may be provided in that the volume of the reference chamber is variable, for instance by an external pressure or vacuum application, or in that the reference chamber is filled with pressurized fluid or in that fluid is drawn off it. A modification of the pressure by changing linked parameters, e.g., phase or temperature of the enclosed fluid, is possible as well.

Especially for the application case in which the micro valve, like conventional valves, is to switch solely as a function of the pressure differential between the first and the second valve chamber, it may be provided that the reference chamber is connected to the first or the second valve chamber.

Especially preferred is an arrangement of the micro valve in which the closing element is provided as diaphragm, which forms a circumferential wall or a circumferential wall section of the reference chamber. In its closing position, the diaphragm, which is planar, in particular, preferably cooperates in a sealing manner with a separation wall disposed between the first and the second valve chamber, preferably with the end face of this separation wall pointing in the direction of the diaphragm. The separation wall is preferably disposed in the base plate, in which the two valve chambers are provided as well. For example, the separation wall may be produced in that the region subsequently forming the separation wall is protected by an etching mask when the valve chambers are etched. It may be provided that the separation wall subdivides a trench in the base plate into the two valve chambers. It is also possible that the two valve chambers are nested in the radial direction, i.e., placed coaxially with respect to each other, the separation wall preferably having a ring-shaped, in particular circular-ring-shaped, contour in this case.

As mentioned in the beginning, in the simplest form, the micro valve operates in both pressure directions; the opening of the micro valve merely requires that the pressure in one of the two valve chambers exceeds the pressure in the reference chamber. To restrict this mechanism of action to only one opening direction, in particular in order to provide the micro valve as discharge valve which preferably opens only in response to a pressure surge in one of the two valve chambers, the diaphragm is formed such that or is provided with at least one reinforcement structure such that the micro valve opens only when a pressure surge occurs in a specific one of the two valve chambers and the pressure in the reference chamber is exceeded as a result, whereas the micro valve is not to open when a pressure surge is recorded in the other valve chamber. According to this arrangement, a micro valve is obtained which is directed to the fluid flow direction. In particular, the diaphragm is formed or provided with a reinforcement structure such that the area coverage of the diaphragm or the not reinforced area of the diaphragm is asymmetrically distributed between the valve chambers. Given a suitable form of the diaphragm or a suitable placement of the reinforcing structure, this has the result that the micro valve substantially opens in only one direction, i.e., only if a fluid pressure that exceeds the reference pressure arises in the valve chamber delimited by the largest surface segment of the diaphragm or the not reinforced area of the diaphragm, since the diaphragm forms the greatest effective area for the pressure in this valve chamber. On the other hand, if a pressure surge is acting in the other valve chamber, i.e., the valve chamber delimited by the smaller surface segment of the diaphragm or the not reinforced region of the diaphragm, then the diaphragm or the reinforced structure is able to absorb this pressure surge at least approximately in full. Suitable diaphragm shapes or contours are able to be calculated and optimized with the help of computer-supported simulation methods.

If the micro valve is to be used as intake valve, i.e., the micro valve is to open at a vacuum pressure that undershoots the reference pressure in the second valve chamber, for example, such that fluid is able to flow out of the first valve chamber and into the second valve chamber, then a support element, in particular a support wall, on which the diaphragm may be supported and which is set apart from the separation wall, is provided inside the second valve chamber, so that the diagram is "pushed away" from the separation wall if a vacuum pressure prevails in the second valve chamber, which causes the connection between the valve chambers to open, so that fluid can flow from the first valve chamber into the second valve chamber. Preferably, the support element has at least roughly the same height as the separation wall.

In example embodiments of the present invention, the support element advantageously has two support walls, which are situated to the side of a through hole. In other words, the support elements subdivide the second valve chamber into two partial valve chambers which are interconnected via the through hole, one partial valve chamber being delimited between the separation wall and the support walls, and the other partial valve chamber, preferably the larger partial valve chamber, being delimited only by the support wall and not by the separation wall. The desired function may be supplemented, for instance by suitable reinforcement structures on the diaphragm, which enhance the lever action.

Preferred is an arrangement of the micro valve in which the first and the second valve chambers are introduced in a base plate made of a semiconductor material, in particular, and in which the closing element is formed in a functional layer, the functional layer preferably including of boron silicate glass or a PDMS. The functional layer and the base plate are joined to one another, preferably after having been structured separately, by anodic or plasma-active bonding, in particular. If the base plate includes a separation wall between the valve chambers, which separates the two valve chambers from each other, an arrangement is preferred in which the separation wall is provided with an anti-bonding layer at its end face and/or the diaphragm at its lower side, in order to prevent the diaphragm from adhering to the separation wall during the bonding process.

As mentioned in the introduction, example embodiments of the present invention not only relate to the micro valve as such, but also to a method for producing the micro valve, the micro valve including a base plate and a functional layer, which are joined to each other. It may be provided to first structure the base plate and the functional layer and then to join them to one another. It may be provided to merely structure the base plate first, then to join the functional layer to it, and then to structure the functional layer; it is preferred if micromechanical methods such as trench etching are used for the structuring of the base plate and/or the functional layer. In addition or as an alternative, it is possible to produce the base plate and/or the functional layer by injection molding and/or hot-stamping. It is possible to produce the raised structures of the base plate and/or the functional layer by additive processes, such as, for example, the application and structuring of a suitable varnish such as SU-8. In addition, the joining of the functional layer and the base plate with the aid of an adhesive bonding agent is possible, the adhesive preferably to be applied such that the closing element is freely adjustable in its sealing area.

Care must be taken when joining the functional layer and the base plate to ensure that the closing element, at least in its active sealing region, does not adhere to the base plate, in particular to a separation wall of the base plate, and that the closing element and/or the base plate are/is at least regionally provided with an anti-bonding layer.

Furthermore, example embodiments of the present invention provide a micro pump having at least one previously described micro valve. The micro pump preferably includes at least two micro valves, one of which is arranged as an intake valve and the other as a discharge valve. In example embodiments, the micro pump includes a pump chamber, which forms the second chamber of the intake valve and the first chamber of the discharge valve.

Additional advantages, features and details of example embodiments of the present invention are described in more detail below with reference to the figures.

BRIEF DESCRIPTION OF THE DRAWINGS

FIG. 7b illustrates a micro valve arranged as an intake valve, utilizing the base plate according to FIG. 7a;

DETAILED DESCRIPTION

Identical components and components having the same function are labeled by the same reference symbols in the figures.

Figure 1A:
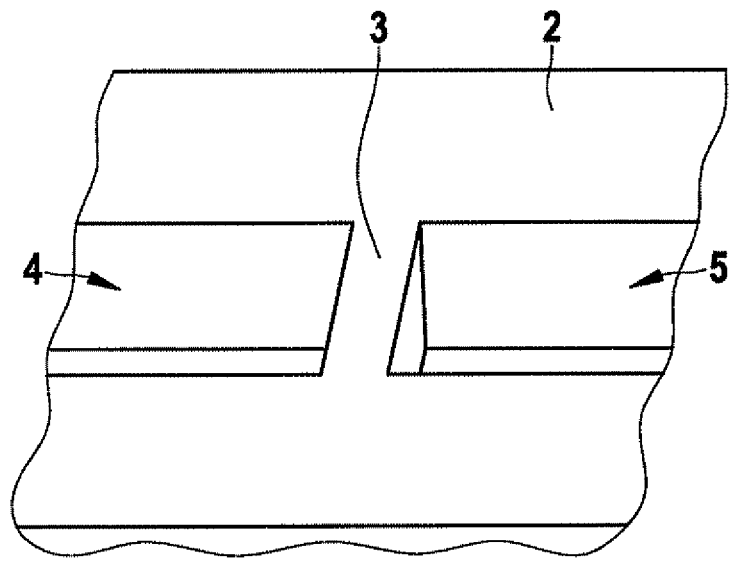
FIG. 1a is a schematic representation of a section of a base plate of a micro valve, two valve chambers, which are separated from each other by a separation wall, having been introduced in the base plate.
Figure 1B:
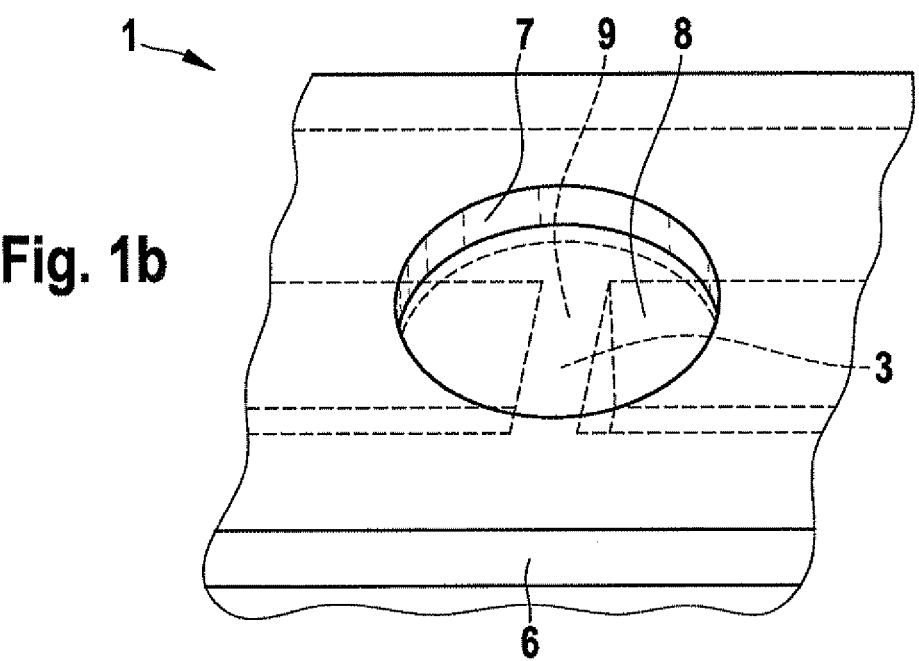
FIG. 1b illustrates a micro valve formed by a base plate according to FIG. 1a and by a joining layer.

FIGS. 1a and 1b illustrate the basic structure of a micro valve 1. FIG. 1a shows a base plate 2 made of a semiconductor material, into which a channel or trench has been introduced, which is separated by a separation wall 3, the resulting channel sections forming a first and a second valve chamber. Separation wall 3 extends perpendicular to the longitudinal extension of the channel.

A functional layer 6 has been affixed on top of base plate 2, and a reference chamber 7 has been introduced in functional layer 6, which reference chamber may be connected to the environment at the upper side in the drawing plane, or which preferably may be sealed by an additional layer (plate). The bottom of reference chamber 7 contoured in the shape of a circular ring is formed by a closing element arranged as an elastic diaphragm, the closing element extending across both valve chambers 4, 5. Separation wall 3 is situated underneath diaphragm-shaped closing element 8 in an approximately centered manner. In a closing position, closing element 8 sits on an end face 9 of separation wall 3 and is lifted off therefrom in an opening position, so that a fluid exchange may take place between valve chambers 4, 5. In the exemplary embodiment shown, functional layer 6 is a polymer plate of PDMS, into which reference chamber 7 has been embossed. The thickness of the diaphragm-shaped closing element 8 must be selected such that proper stability with sufficient flexibility is provided for the applied pressures. The working point of micro valve 1 is able to be determined via the selection of the pressure in reference chamber 7. If required, the pressure in reference chamber 7 is variable. This may be provided, for instance, in that reference chamber 7 is sealed on the side lying opposite closing element 8, by a diaphragm on which a piston, e.g., a piezo element, is acting, or in that the reference chamber is connected to a pressure- and/or vacuum-application line.

Figure 2A:
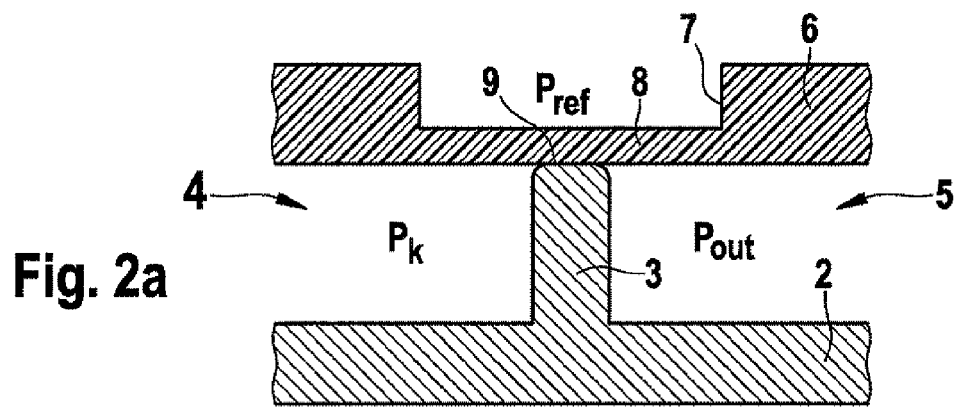
FIG. 2a through FIG. 2c are schematic representations of different switching states of the micro valve shown in FIG. 1b.

Using FIG. 2a through 2c, the method of functioning of micro valve 1 according to FIG. 1b will be explained in the following text. It is assumed that first valve chamber 4 is a pump chamber of a micro pump. FIG. 2a shows the neutral position of micro valve 1, in which closing element 8 lies sealingly on end face 9 of separation wall 3. Pressure $P_K$ is prevailing inside first valve chamber 4, pressure $P_{Ref}$ is prevailing in reference chamber 7, and pressure $P_{out}$ is prevailing in second valve chamber 5. If a pressure surge occurs in first valve chamber 4 serving as pump chamber, so that the pressure in first valve chamber 4 exceeds the reference pressure inside reference chamber 7, then flexible, diaphragm-type closing element 8 lifts off from its valve seat formed by the end face of separation wall 3, so that micro valve 1 opens and fluid is able to flow from first chamber 4 into second chamber 5. FIG. 2c shows the aspiration phase of a micro pump equipped with a micro valve 1, in which the pressure in first valve chamber 4 drops (considerably) below the pressure (reference pressure) inside reference chamber 7. Closing element 8 is thereby sucked toward separation wall 3 or pressed against it, which increases the sealing of both valve chambers 4, 5, i.e., the sealing is even stronger than in the neutral state shown in FIG. 2a. It is important that the actuating pressure difference of the micro valve is not the pressure difference between the two valve chambers 4, 5, but the pressure difference between first valve chamber 4 and reference chamber 7. As already mentioned in the introduction, the working point is selectable by the choice of the reference pressure in reference chamber 7, similar to the initial stress of the diaphragm in classic micro valves.

Figure 2B:
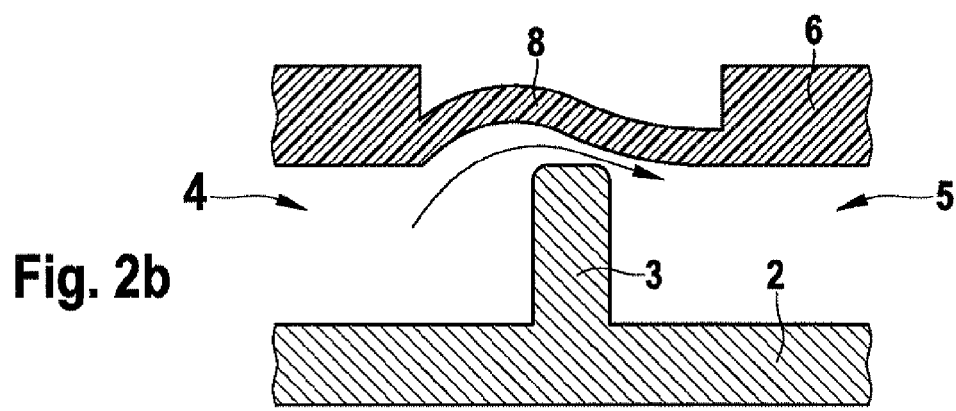
Figure 2C:
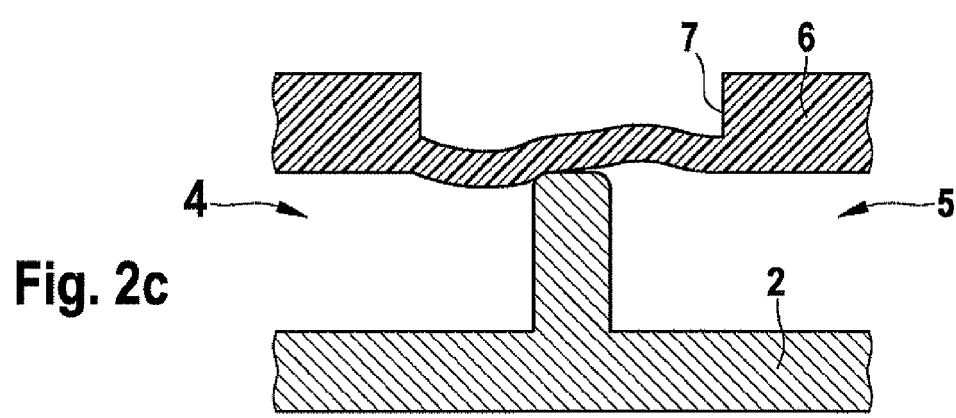

The mechanism shown in FIG. 2a through 2c acts in both directions, i.e., micro valve 1 according to FIG. 2a through 2c would also open if a pressure surge that exceeded the reference pressure would occur in second valve chamber 5.

In order to obtain a micro valve 1 that is acting in one direction only, it is possible to form and/or place closing element 8 appropriately, and/or to provide it with a reinforcement structure.

Figure 3:
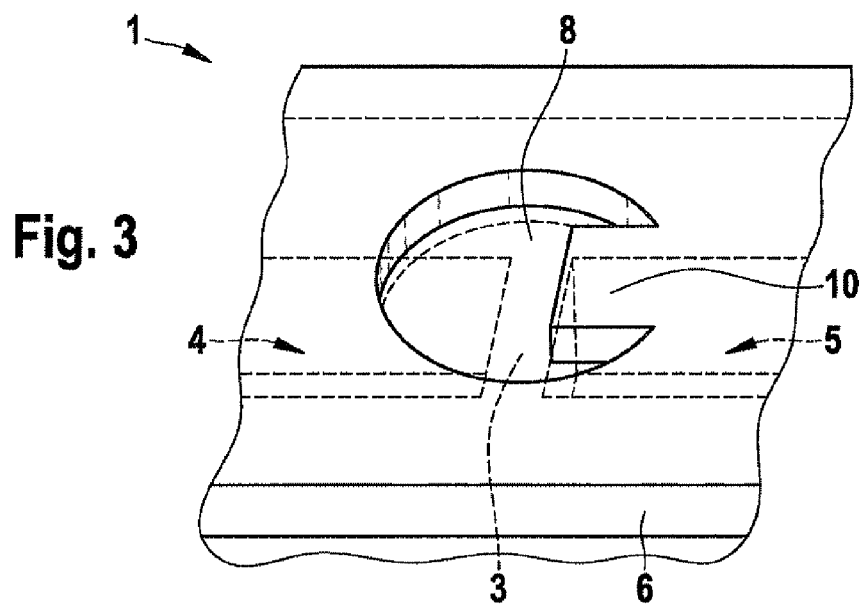
FIG. 3 is a schematic representation of a micro valve arranged as a discharge valve.

Such a micro valve 1 is shown in FIG. 3. Micro valve 1 shown in FIG. 3 is particularly suitable for use as discharge valve. To be gathered is the asymmetrical structure of diaphragm-shaped closing element 8. Actual diaphragm-shaped closing element 8 covers first valve chamber 4 by a larger surface segment than second valve chamber 5. According to a first alternative, closing element 8 was produced directly in the illustrated form, in particular etched or embossed. According to a second alternative, closing element 8 was initially produced as an annular structure shown in FIG. 3, whereupon reinforcement structure 10 made of functional layer material, in particular, was applied. As an alternative, reinforcement structure 10 consists of a material that differs from the material of functional layer 6. Because of the asymmetrical shape and placement of closing element 8, micro valve 1 will open, or closing element 8 lift off from separation wall 3, only in response to a pressure surge arising in first valve chamber 4. Reinforcement structure 10 has virtually no effect in this context. However, if a pressure surge arises in second valve chamber 5, then this pressure surge is largely absorbed because of reinforcement structure 10 or because of the asymmetrical shape and placement of closing element 8, so that preferably no fluid exchange from second valve chamber 5 into first valve chamber 4 results in this case.

Figure 4A:
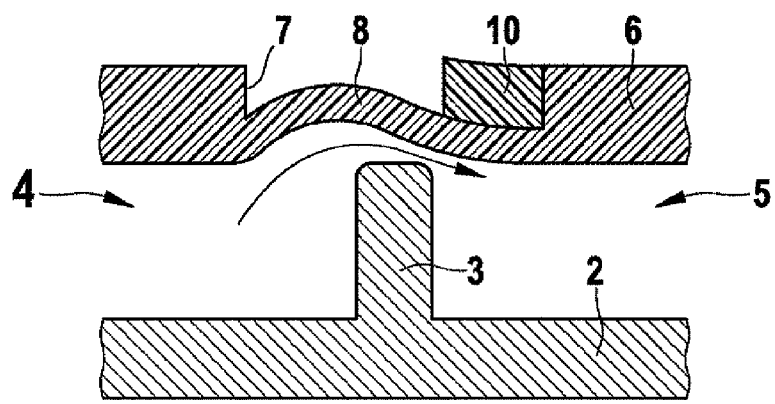
FIG. 4a and FIG. 4b illustrate different switching states of the micro valve according to FIG. 3, in a schematic representation.
Figure 4B:
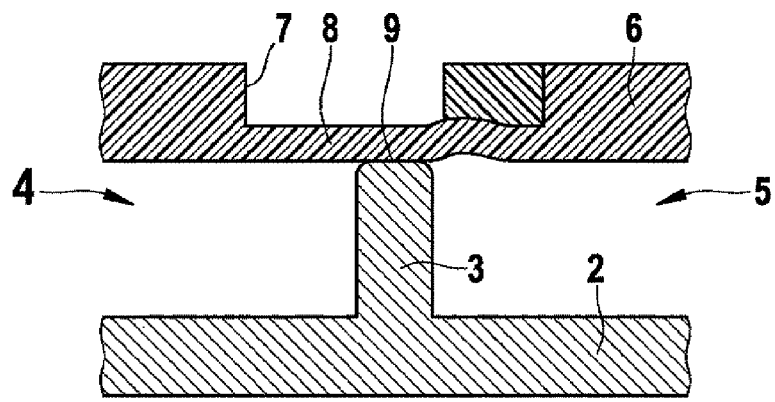
Figure 5A:
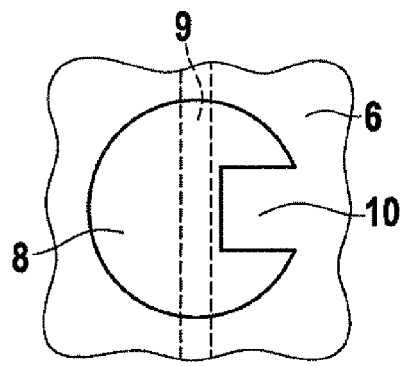
FIG. 5a through FIG. 5d illustrate different arrangements of closing elements.
Figure 5B:
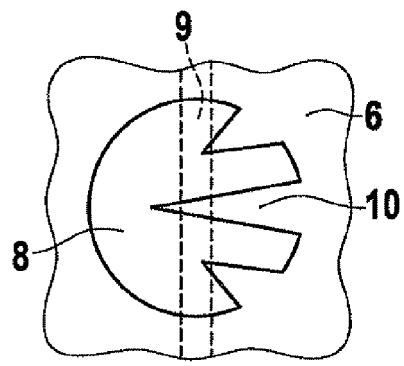
Figure 5C:
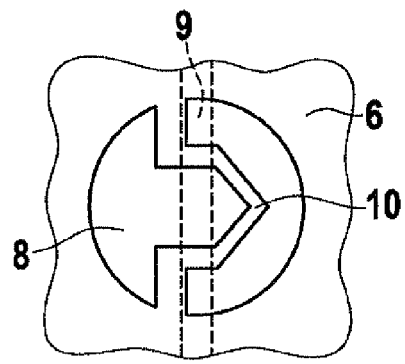
Figure 5D:
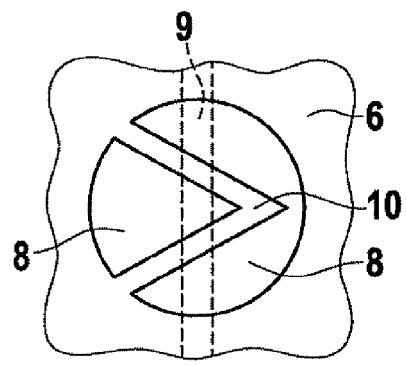

The method of functioning of micro valve 1, shown in FIG. 3 and arranged as a discharge valve, is illustrated in detail in FIGS. 4a and 4b. FIG. 4a shows a pressure surge situation in first valve chamber 4. As can be gathered, diaphragm-shaped closing element 8 lifts off from separation wall 3 and fluid is therefore able to flow from first valve chamber 4 into second valve chamber 5. Reinforcement structure 10 has virtually no or only a negligible effect in this context. It can be seen that reinforcement structure 10 is drawn in contrasted fashion in FIG. 4a and FIG. 4b, that is to say, it is made from a different material than functional layer 6. However, an arrangement in which reinforcement structure 10 is formed by a segment of functional layer 6 not removed or removed to a lesser degree, is preferred.

FIG. 4b shows the case of a pressure surge in second valve chamber 5. It can be seen that, although the pressure in second valve chamber 5 exceeds the reference pressure in reference chamber 7 in this case, this pressure surge does not induce closing element 8 to lift off from end face 9 of separation wall 3. The reason for this is the smaller pressure-working surface of closing element 8 above second valve chamber 5.

FIG. 5a through 5d show possible arrangements of diaphragm-shaped closing element 8. The reinforcement region formed by functional layer 6 in each case is denoted by reference numeral 10. For better orientation, the contour of end face 9 of separation wall 3 has been drawn in. As can be gathered from FIGS. 5c and 5d, closing element 8 may also have a two-part design by suitable placement of reinforcement structure 10. In addition, a three-piece etc. arrangement of closing element 8 is possible as well.

Figure 6:
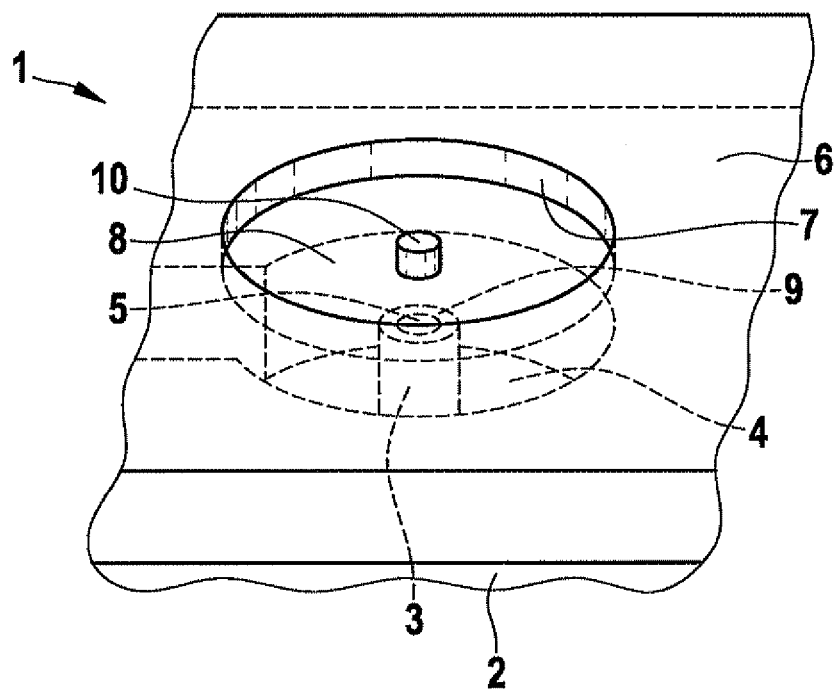
FIG. 6 illustrates an arrangement of a micro valve having radially nested valve chambers.

From FIG. 6 it can be gathered that the two-part production technology of the three-chamber valve even allows for the production of classic valve structures; resulting micro valves 1 include a reference chamber 7, which extends across the entire area coverage of both valve chambers 4, 5 in this arrangement. In the illustrated exemplary embodiment, second valve chamber 5 is disposed radially inside first valve chamber 4 and enclosed by an annular separation wall 3. In its centrical region above second valve chamber 5, closing element 8 having a circular ring-shaped contour is provided with a reinforcement structure 10, which ensures that micro valve 1 according to FIG. 6 opens only from first valve chamber 4 in the direction of second valve chamber 5, so that it may be used as discharge valve for a pump chamber of a micro pump, the pump chamber in the left drawing half according to FIG. 6 discharging into second valve chamber 5 having a circular ring-shaped contour.

Figure 7A:
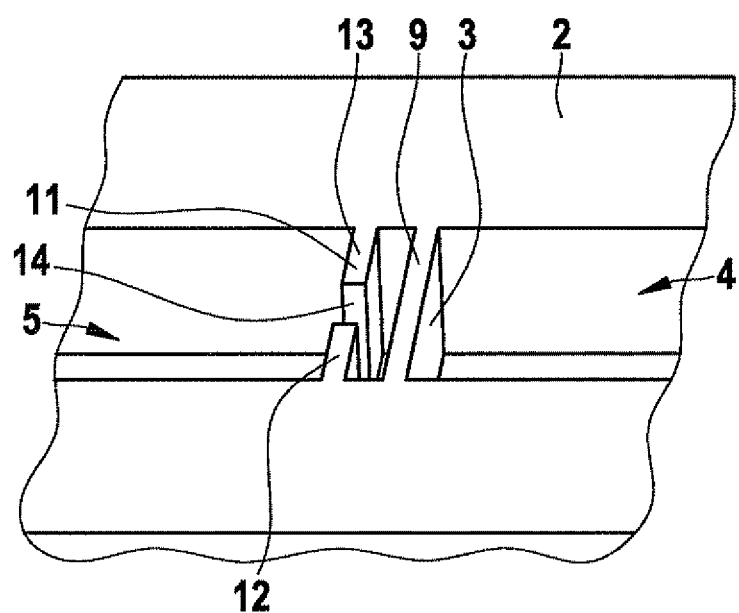
FIG. 7a is a schematic representation of a modified base plate for a micro valve designed as intake valve, the micro valve having a support element for the closing element.
Figure 7B:
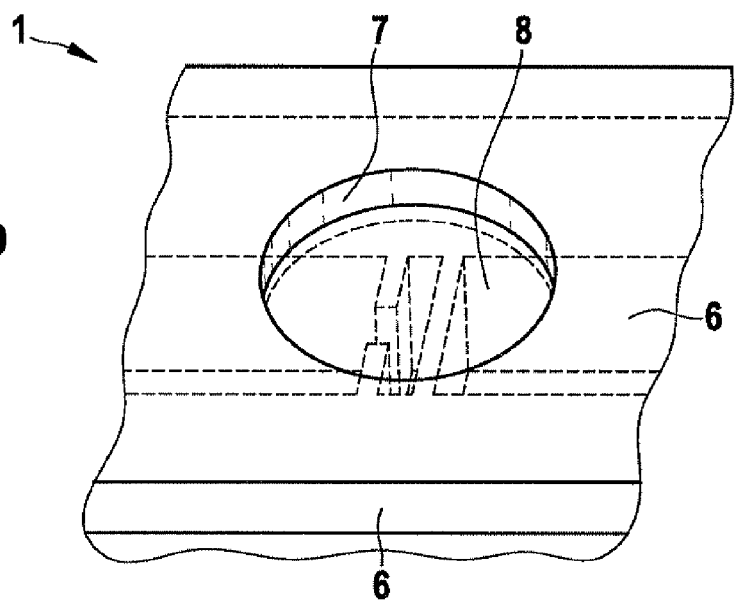

FIG. 7a shows a base plate 2 of a micro valve 1 schematically illustrated in FIG. 7b, which is arranged as an intake valve. Valve chambers 4, 5 have been switched in the illustration compared with the previous figures. First valve chamber 4 is shown on the right side of the drawing, while second valve chamber 5 is shown on the left side. A channel introduced in base plate 2 is interrupted by a separation wall 3 having an upper free end face 9. To the left of separation wall 3 in the drawing plane, a two-piece support element 11 is provided, which has two support walls 12, 13, set apart from each other, which delimit a central through hole 14 on the side. Because of support element 11, second valve chamber 5 is subdivided into two sectional chambers.

FIG. 7b shows finished micro valve 1 arranged as an intake valve. As can be gathered, the support element is located in an approximately centrical position with respect to the area coverage of diaphragm-shaped closing element 8 underneath closing element 8.

Figure 8A:
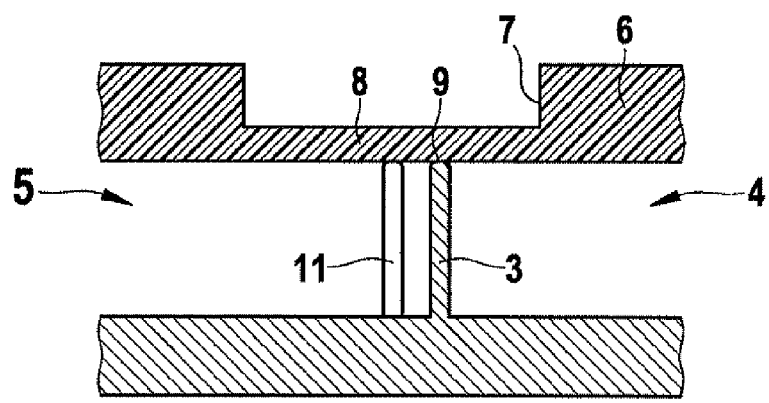
FIG. 8a and FIG. 8b illustrate different switching states of the micro valve according to FIG. 7b.
Figure 8B:
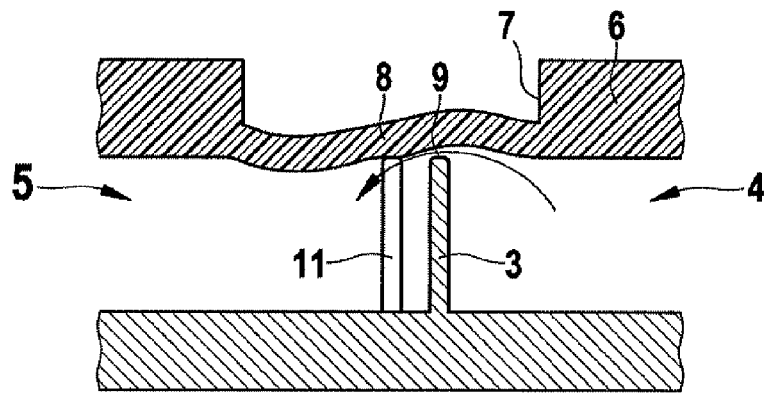

The method of functioning of micro valve 1 according to FIG. 7b is shown in detail in FIGS. 8a and 8b. FIG. 8a illustrates the neutral position in a pressure equalization. The reference pressure within reference chamber 7 corresponds at least approximately to the pressure inside first and second valve chamber 4, 5. Support walls 12, 13 of support element 11 have at least roughly the same height as separation wall 3, so that in this neutral position closing element 8 supports itself both on support element 11 and separation wall 3.

FIG. 8b shows a switching situation in which a vacuum pressure arises in second valve chamber 5 arranged as pump chamber, i.e., the pressure in second valve chamber 5 drops below the reference pressure. This causes diaphragm-shaped closing element 8 to be sucked into second valve chamber 5. Because of the off-center placement of separation wall 3 and the provision of support element 11, closing element 8 is pressed away from end face 9 of separation wall 3, so that fluid from first valve chamber 4 is able to flow into second valve chamber 5 acting as pump chamber. If the lever action resulting from support element 11 were not provided, then micro valve 1 would not open at a vacuum pressure in second valve chamber 5, but be aspirated even further toward separation wall 3 or pressed against it. In addition to the provision of support element 11, closing element 8 may of course be modified by reinforcement structures 10 and optimized for the individual application.

Figure 9:
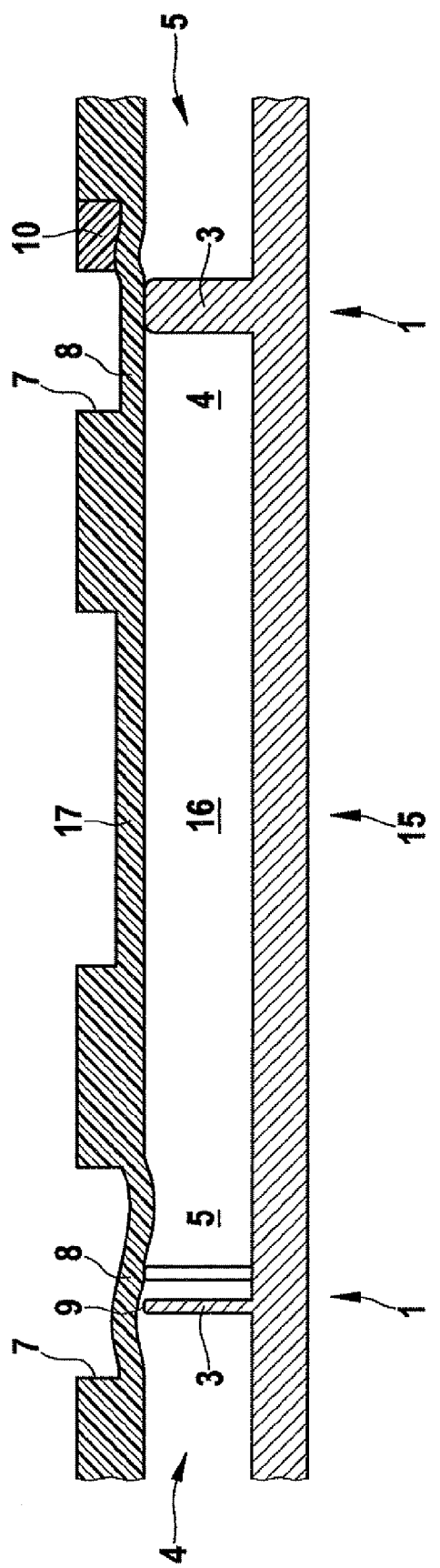
FIG. 9 illustrates a micro pump having the intake valve shown in FIG. 7b and the discharge valve, shown in FIG. 3.

FIG. 9 shows a micro pump 15. Micro pump 15 has a pump chamber denoted by reference numeral 16; pump chamber 16 forms second valve chamber 5 of a micro valve 1, which is arranged as an intake valve and shown on the left side of the drawing, and simultaneously the first valve chamber 4 of a micro valve 1 shown on the right side of the drawing and arranged as a discharge valve. The basic method of functioning of micro valves 1 (intake and discharge valve) was already explained with the aid of the previous figures, so that reference is made to the previous description of the figures in order to avoid repetitions.

Pump chamber 16 is provided with a pump diaphragm 17, which is able to be moved in and out of pump chamber 16 with the aid of an actuator (not shown). During the aspiration phase of micro pump 15, i.e., when pump diaphragm 17 is moved out of pump chamber 16 in an upward direction in the drawing plane, closing element 8 of micro valve 1 arranged as an intake valve is pushed away from separation wall 3 or its end face 9 (shown), so that fluid is able to flow from first valve chamber 4 of micro valve 1 into pump chamber 16. In the pressure phase, i.e., when pump diaphragm 17 is moved into pump chamber 16, diaphragm-shaped closing element 8 of the micro valve arranged as a discharge valve lifts off from separation wall 3, thereby allowing fluid to flow out of pump chamber 16 and into second valve chamber 5 of micro valve 1. Reinforcement structure 10 of micro valve 1 arranged as a discharge valve can be seen on the right side of the drawing. During this pressure phase, an opening of micro valve 1 arranged as an intake valve (left drawing half) due to the less optimal leverage of closing element 8 by a suitable configuration. In addition, closing element 8 of micro valve 1 used as an intake valve may be provided with a suitable reinforcement structure 10 in its right region in the drawing plane.

What is claimed is:

1. A micro pump, comprising:
   at least one micro valve arranged as at least one of (a) an intake valve and (b) a discharge valve, the micro valve including:
   a first valve chamber;
   a second valve chamber;
   a closing element adjustable between an open position, in which the valve chambers are connected to each other, and a close position in which the valve chambers are separated from each other; and
   a reference chamber delimited by the closing element;
   wherein:
   the closing element is adapted to move from the close position into the open position in response to pressure in at least one of the first and the second valve chambers;
   a reference pressure established by one of a fluid and a gas contained in the reference chamber biases the closing element toward the close position and determines how much pressure in the at least one of the first and the second valve chambers is required to move the closing element into the open position; and
   the closing element is at least one of (a) shaped as and (b) provided with at least one reinforcement structure that prevents the closing element from opening toward a region of the closing element in which the reinforcement structure is located, thereby making moving from the close position to the open position dependent upon a direction of a pressure differential between the first and the second valve chambers.

2. A method for producing a micro pump, comprising:
producing a base plate having a first and a second valve chamber;
producing a functional layer including a closing element and a reference chamber delimited by the closing element; and
joining the functional layer to the base plate;
wherein:
the producing of the functional layer includes forming the closing element and the reference chamber such that after the base plate and the functional layer are joined:
the closing element is adjustable between an open position, in which the valve chambers are connected to each other, and a close position in which the valve chambers are separated from each other, the closing element being adapted to move from the close position into the open position in response to pressure in at least one of the first and the second valve chambers; and
a reference pressure established by one of a fluid and a gas contained in the reference chamber biases the closing element toward the close position and determines how much pressure in the at least one of the first and the second valve chambers is required to move the closing element into the open position; and
the closing element is at least one of shaped and provided with at least one reinforcement structure that prevents the closing element from opening toward a region of the closing element in which the reinforcement structure is located, thereby making moving from the close position to the open position dependent upon a direction of a pressure differential between the first and the second valve chambers.

3. The method according to claim 2, wherein at least one of (a) the functional layer is joined to the base plate prior to producing the closing element and (b) the closing element is introduced into the base plate once the functional layer has been joined to the base plate.

4. The method according to claim 2, wherein, prior to the joining, an anti-bonding layer is applied on a separation wall in the base plate cooperating with the closing element.

5. A micro valve, comprising:
a first valve chamber;
a second valve chamber;
a closing element adjustable between an open position, in which the valve chambers are connected to each other, and a close position in which the valve chambers are separated from each other;
a reference chamber delimited by the closing element;
wherein:
the closing element is adapted to move from the close position into the open position in response to pressure in at least one of the first and the second valve chambers;
a reference pressure established by one of a fluid and a gas contained in the reference chamber biases the closing element toward the close position and determines how much pressure in the at least one of the first and the second valve chambers is required to move the closing element into the open position;

the closing element is arranged as a diaphragm, which, in the close position, is adapted to seal and cooperate with a separation wall which separates the first and the second valve chamber from one another; and
spaced apart from the separation wall, a support element of at least the same height as the separation wall is provided in the second valve chamber, the closing element being directly supported in the close position against both the separation wall and the support element.

6. The micro valve according to claim 5, wherein the support element has support walls disposed to both sides of a through hole.

7. The micro valve according to claim 5, wherein the support element is centrally located with respect to the diaphragm to support the diaphragm in a region of a diaphragm center.

8. The micro valve according to claim 7, wherein the separation wall is off-center with respect to the diaphragm, and the support element establishes a connection between the valve chambers when vacuum pressure exceeding the reference pressure is applied to the second valve chamber, by providing, in response to the vacuum pressure, a lever action that presses the closing element away from the separation wall.

9. A micro valve, comprising:
a first valve chamber;
a second valve chamber;
a closing element adjustable between an open position, in which the valve chambers are connected to each other, and a close position in which the valve chambers are separated from each other; and
a reference chamber delimited by the closing element;
wherein:
the closing element is adapted to move from the close position into the open position in response to pressure in at least one of the first and the second valve chambers;
a reference pressure established by one of a fluid and a gas contained in the reference chamber biases the closing element toward the close position and determines how much pressure in the at least one of the first and the second valve chambers is required to move the closing element into the open position; and
the closing element is at least one of (a) shaped as and (b) provided with at least one reinforcement structure that prevents the closing element from opening toward a region of the closing element in which the reinforcement structure is located, thereby making moving from the close position to the open position dependent upon a direction of a pressure differential between the first and the second valve chambers.

10. The micro valve according to claim 9, wherein the reference pressure is adjustable.

11. The micro valve according to claim 9, wherein the reference pressure is adjustable independently of a pressure inside at least one of (a) the first and (b) the second valve chamber.

12. The micro valve according to claim 9, wherein the reference chamber is connected to at least one of (a) the first and (b) the second valve chamber.

13. The micro valve according to claim 9, wherein the first valve chamber and the second valve chamber are co-axially positioned with respect to each other.

14. The micro valve according to claim 9, wherein the closing element is arranged as a diaphragm, which, in the close position, is adapted to seal and cooperate with a separation wall which separates the first and the second valve chamber from one another.

15. The micro valve according to claim 14, wherein the diaphragm is adapted to seal and cooperate with an end face of the separation wall.

16. The micro valve according to claim 9, wherein the first and the second valve chamber are situated in a base plate and the closing element is arranged in a functional layer situated at least one of (a) above the base plate and (b) below the base plate.

17. The micro valve according to claim 16, wherein the base plate is made of a semiconductor material.

18. The micro valve according to claim 16, wherein the closing element is made of a polymer material.

19. The micro valve according to claim 16, wherein the functional layer is joined to the base plate.

20. The micro valve according to claim 16, wherein the functional layer is joined to the base plate by at least one of (a) an anodic and (b) a plasma-active bond.

* * * * *

UNITED STATES PATENT AND TRADEMARK OFFICE
CERTIFICATE OF CORRECTION

PATENT NO. : 8,528,591 B2  
APPLICATION NO. : 12/671138  
DATED : September 10, 2013  
INVENTOR(S) : Pirk et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 608 days.

Signed and Sealed this
Fifteenth Day of September, 2015

Michelle K. Lee
*Director of the United States Patent and Trademark Office*